(12) United States Patent
Lee et al.

(10) Patent No.: US 12,546,630 B2
(45) Date of Patent: Feb. 10, 2026

(54) SENSING DEVICE

(71) Applicant: LG INNOTEK CO., LTD., Seoul (KR)

(72) Inventors: Chang Hwan Lee, Seoul (KR); Sung Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 173 days.

(21) Appl. No.: 18/699,207

(22) PCT Filed: Oct. 5, 2022

(86) PCT No.: PCT/KR2022/014963
§ 371 (c)(1),
(2) Date: Apr. 5, 2024

(87) PCT Pub. No.: WO2023/059052
PCT Pub. Date: Apr. 13, 2023

(65) Prior Publication Data
US 2024/0401987 A1    Dec. 5, 2024

(30) Foreign Application Priority Data

Oct. 7, 2021  (KR) .......................... 10-2021-0133182
Oct. 7, 2021  (KR) .......................... 10-2021-0133185

(51) Int. Cl.
*G01D 5/244* (2006.01)
*G01D 5/14* (2006.01)
(Continued)

(52) U.S. Cl.
CPC ......... *G01D 5/2448* (2013.01); *G01D 18/001* (2021.05); *G01D 5/145* (2013.01); *G01L 3/10* (2013.01)

(58) Field of Classification Search
CPC ...... G01D 5/12; G01D 5/244; G01D 5/24471; G01D 5/2448; G01D 18/001; G01L 3/02;
(Continued)

(56) References Cited

U.S. PATENT DOCUMENTS

| 2011/0303001 A1* | 12/2011 | Hirose | ................... G01L 5/221 |
| | | | 73/117.02 |
| 2016/0091574 A1* | 3/2016 | Xu | ....................... G01R 33/025 |
| | | | 324/207.12 |
| 2021/0302246 A1* | 9/2021 | Fröhlich | ................. G01L 3/104 |

FOREIGN PATENT DOCUMENTS

| JP | 2004-309463 A | 11/2004 |
| KR | 10-2019-0073878 A | 6/2019 |

(Continued)

*Primary Examiner* — Huy Q Phan
*Assistant Examiner* — David B Frederiksen
(74) *Attorney, Agent, or Firm* — Birch, Stewart, Kolasch & Birch, LLP

(57) ABSTRACT

An embodiment may provide a sensing device comprising: a rotor; a stator arranged so as to correspond to the rotor; a first collector arranged above the stator and a second collector arranged under the stator; and a first sensor and a second sensor arranged between the first collector and the second collector, wherein the first collector includes a first unit collector and a second unit collector, and a sensing value of at least one of the first sensor by magnetic flux and the second sensor by magnetic flux is compensated for on the basis of an offset obtained by multiplying, by a compensation coefficient, a difference value between a sensing value of the first sensor transmitted to the first unit collector and a sensing value of the second sensor transmitted to the second unit collector, the sensing value of the at least one of the first sensor and the second sensor being compensated for by selecting any one of a first offset and a second offset on the basis of a first difference value between the first offset that is an n−1st offset and the second offset that is an nth offset, and n being a positive integer.

10 Claims, 22 Drawing Sheets

(51) Int. Cl.
    *G01D 18/00*        (2006.01)
    *G01L 3/10*         (2006.01)
(58) Field of Classification Search
    CPC ... G01L 3/04; G01L 3/10; G01L 3/101; G01L 3/104; B62D 6/10
    See application file for complete search history.

(56)                References Cited

FOREIGN PATENT DOCUMENTS

| KR | 10-2019-0138763 A | 12/2019 |
| KR | 10-2020-0048368 A | 5/2020 |
| KR | 10-2021-0034092 A | 3/2021 |

\* cited by examiner

[Fig.1]
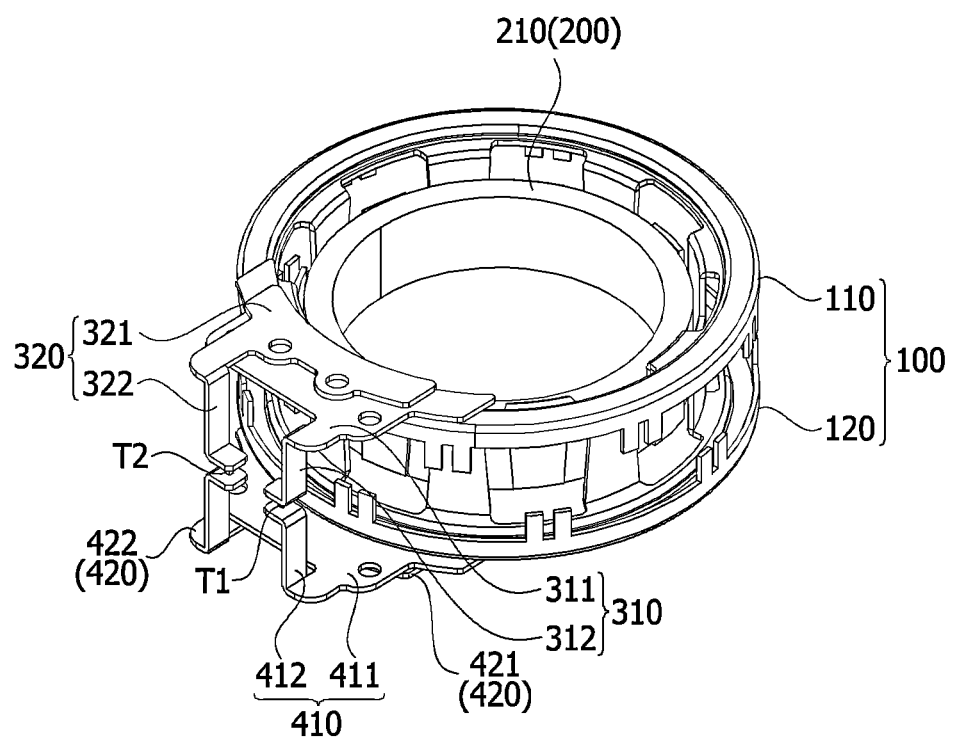

[Fig. 2]
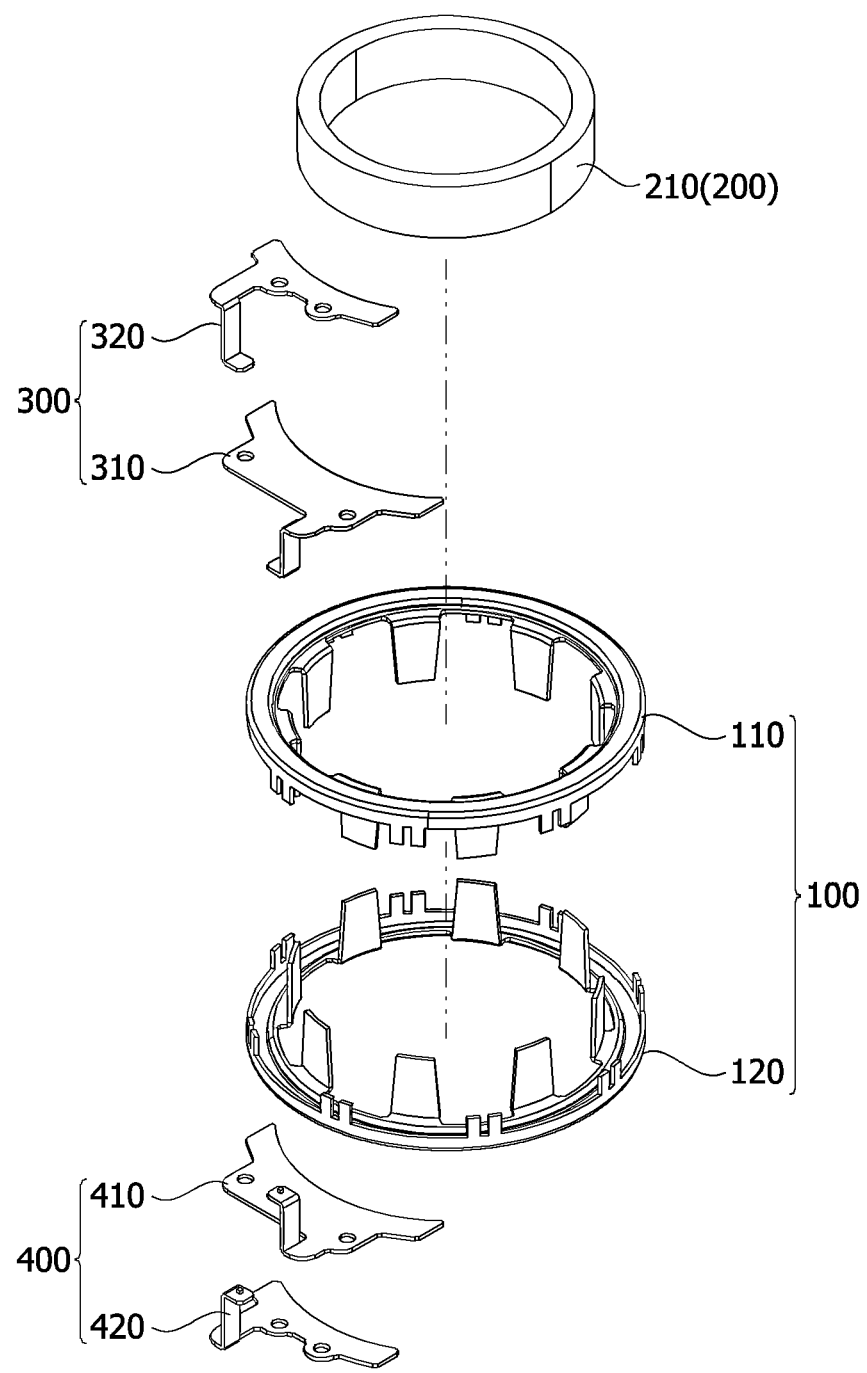

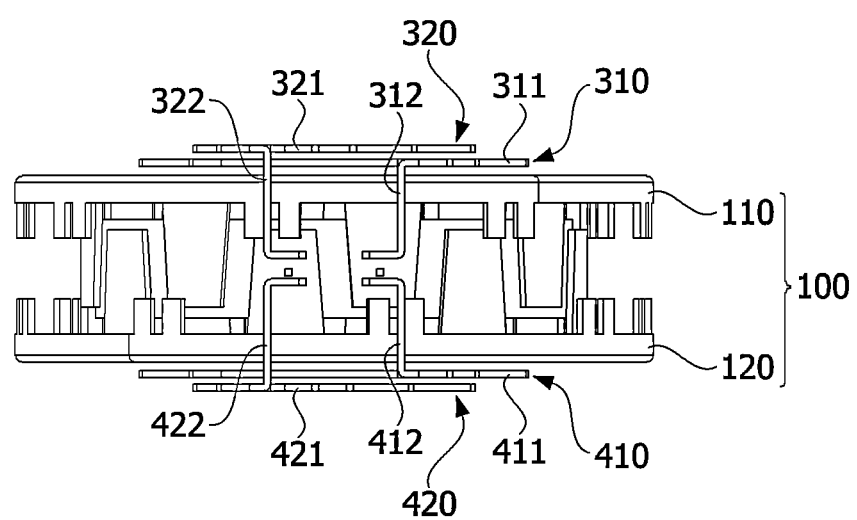
[Fig. 3]

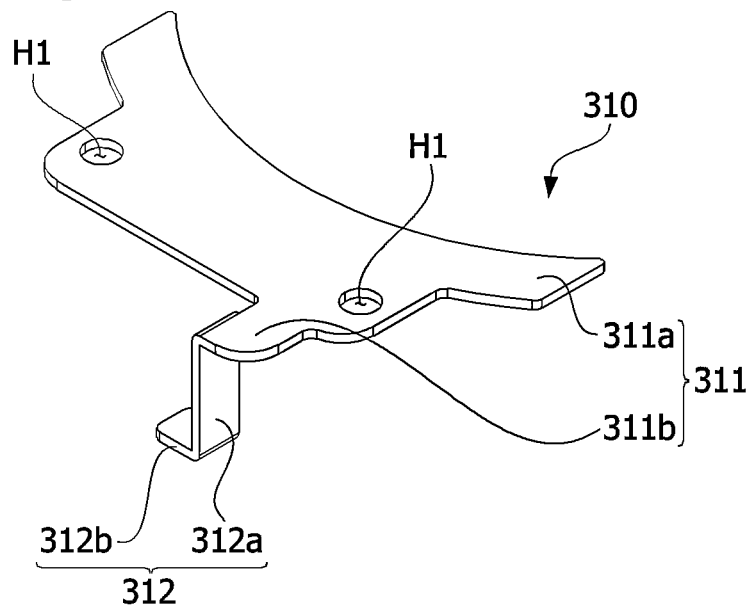
[Fig. 4]

[Fig. 5]
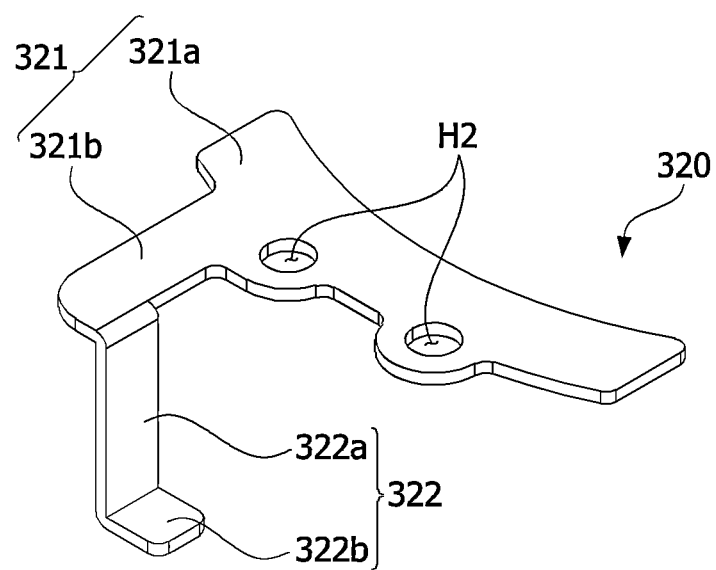

[Fig. 6]
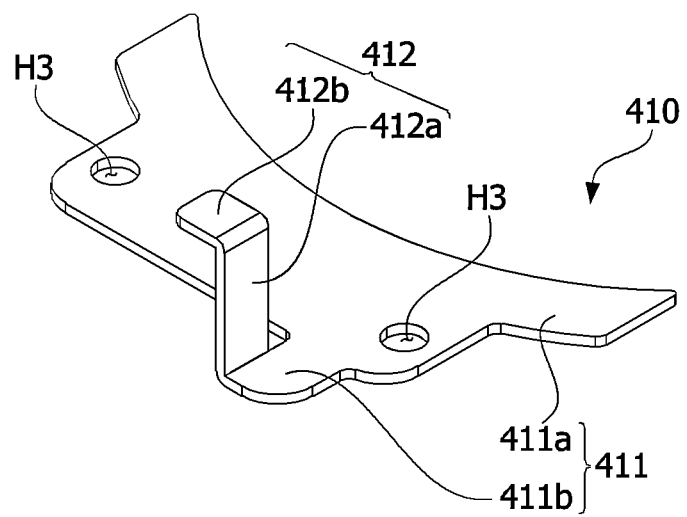

[Fig. 7]
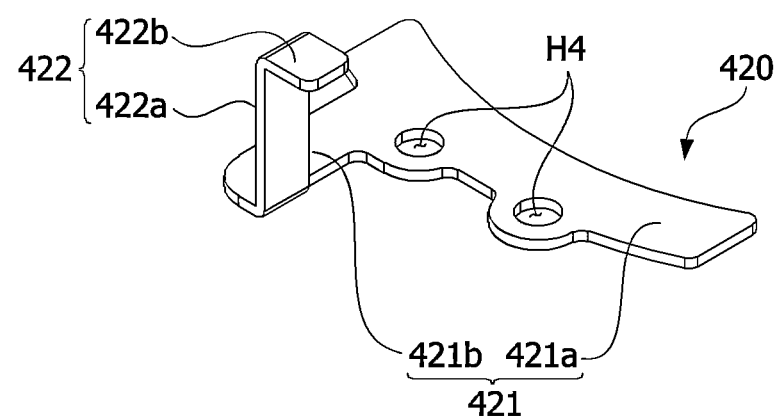

[Fig. 8]
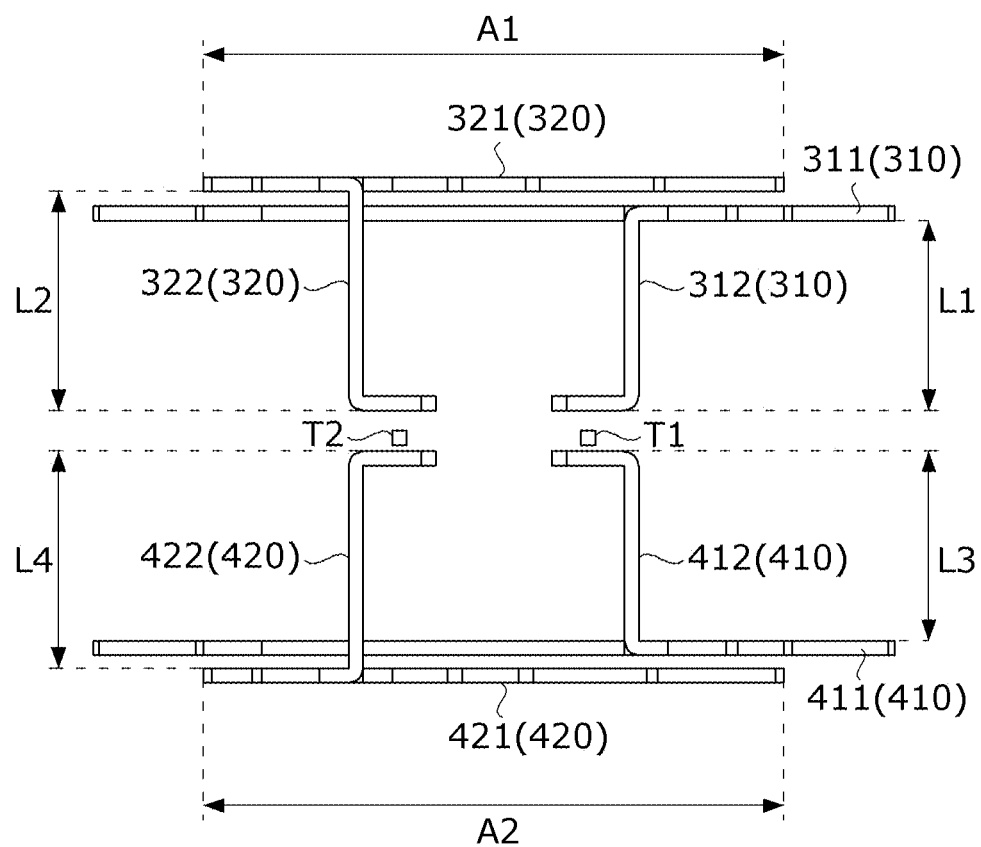

[Fig. 9]
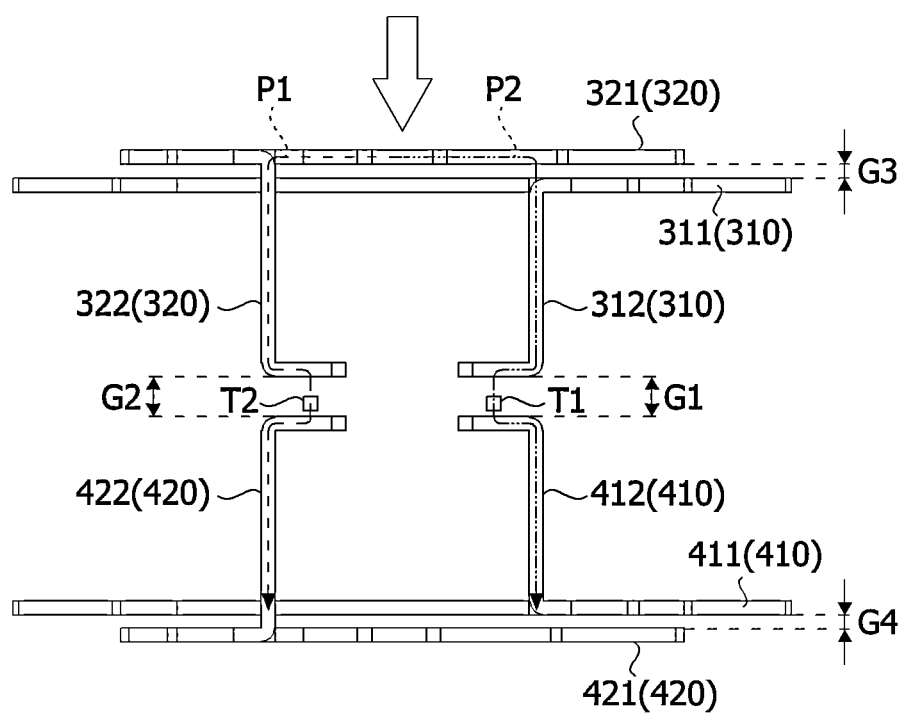

[Fig. 10]
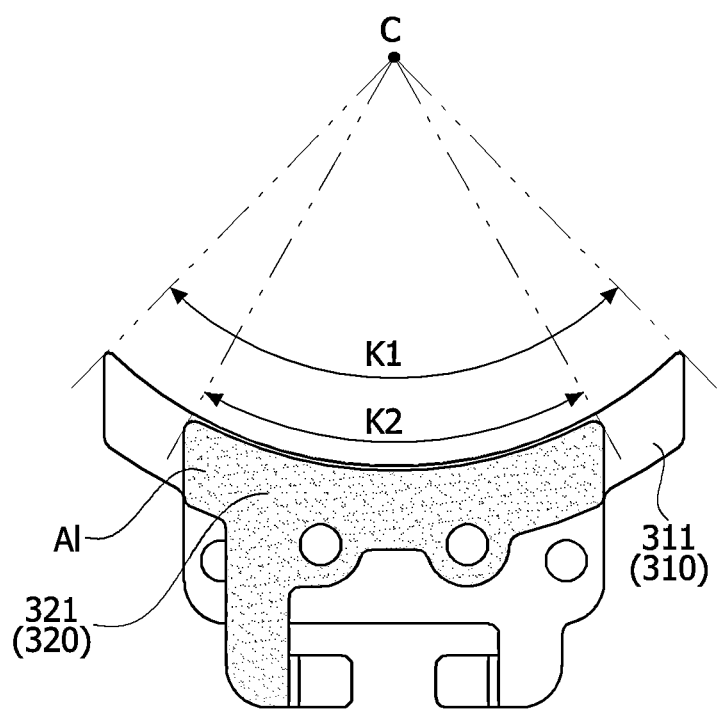

[Fig. 11]
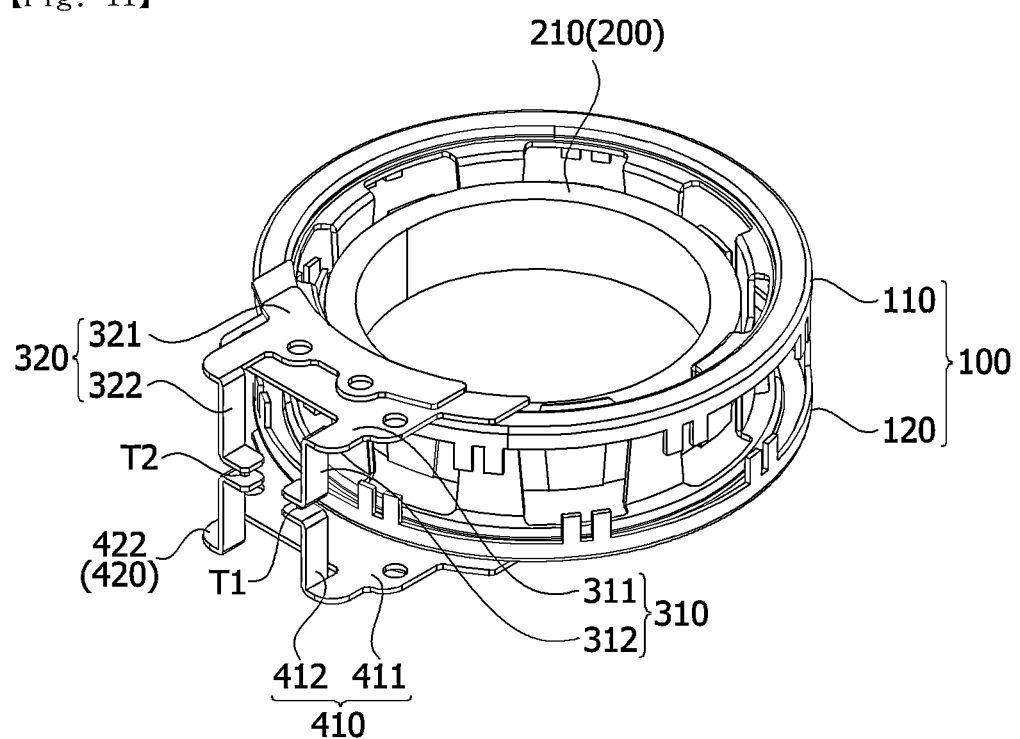

[Fig. 12]
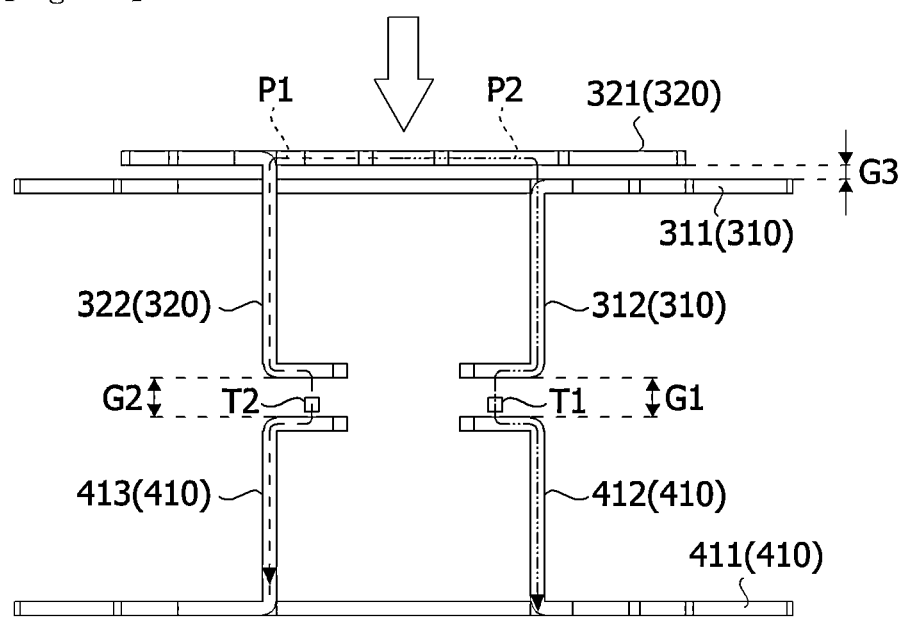

[Fig. 13]
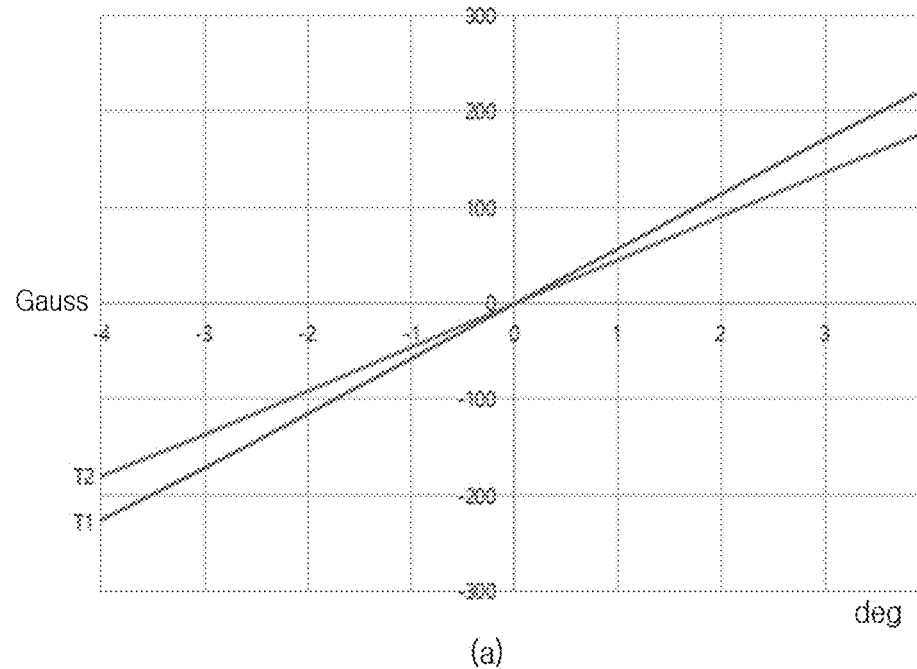
(a)
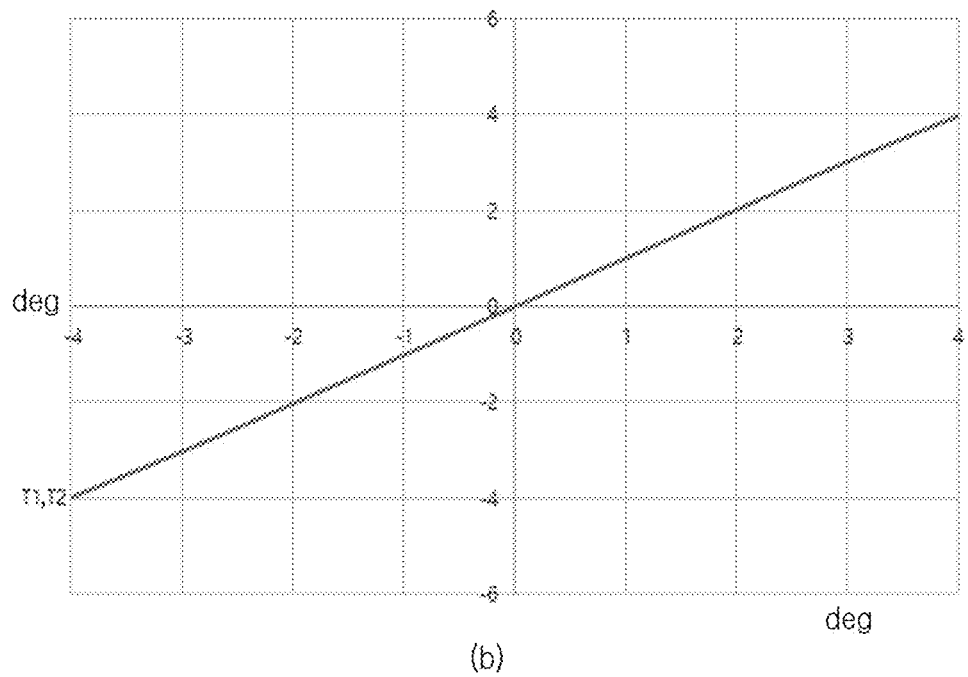
(b)

[Fig. 14]
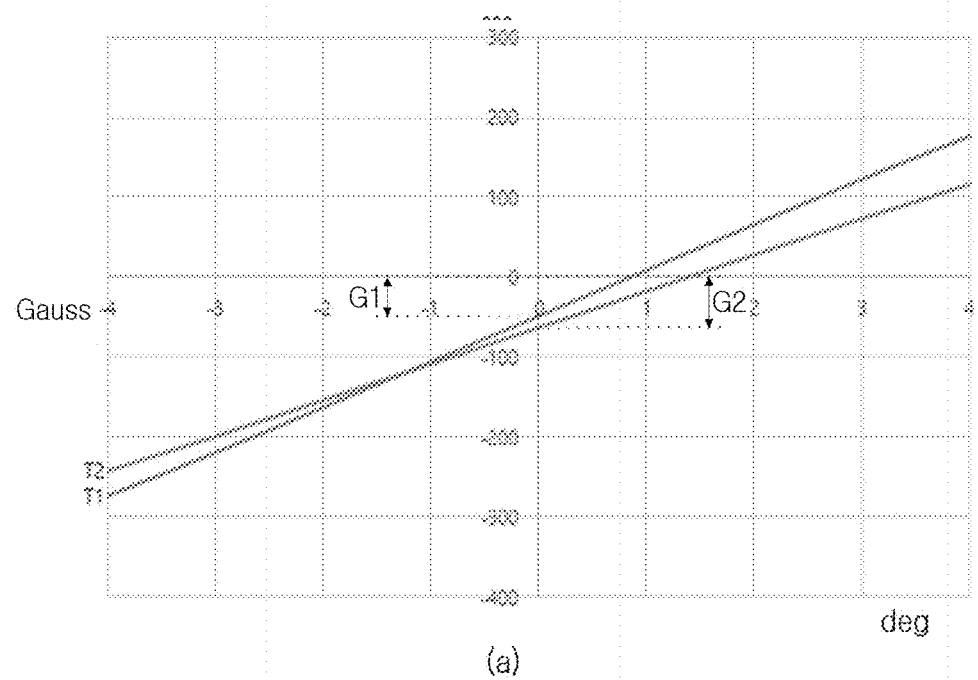
(a)
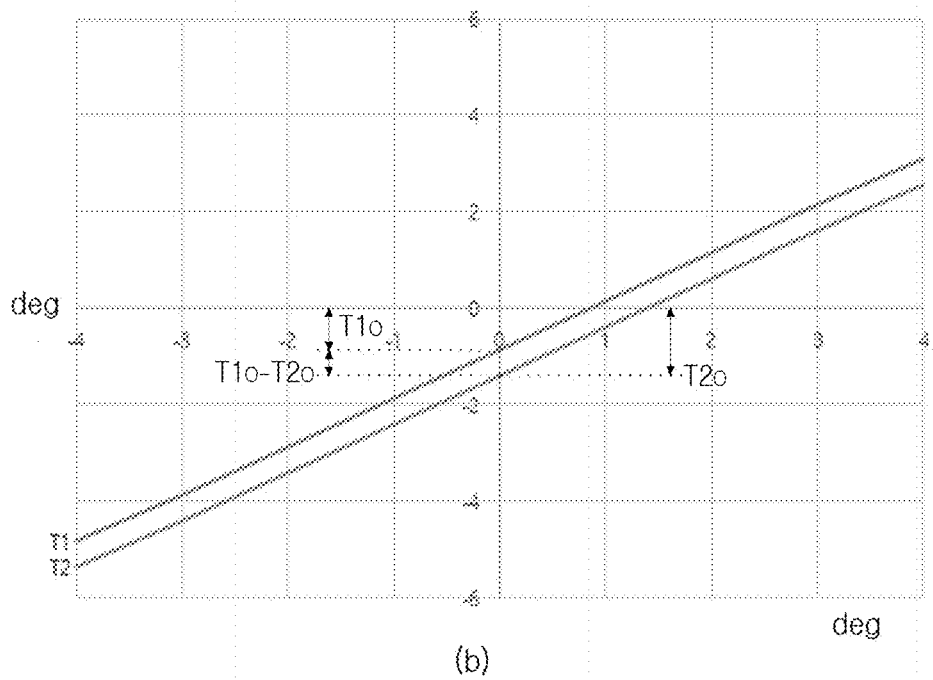
(b)

[Fig. 15]
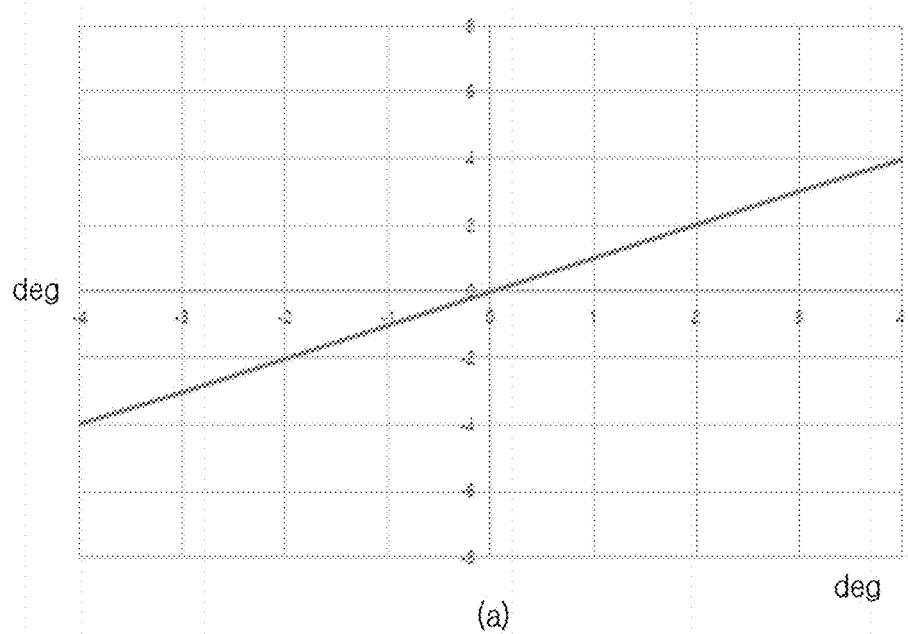
(a)
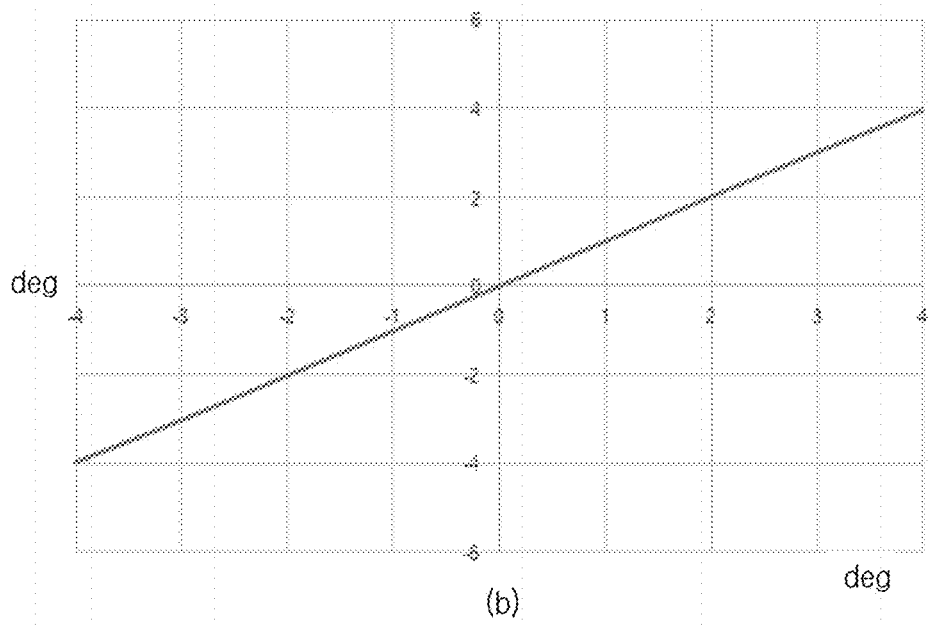
(b)

[Fig. 16]
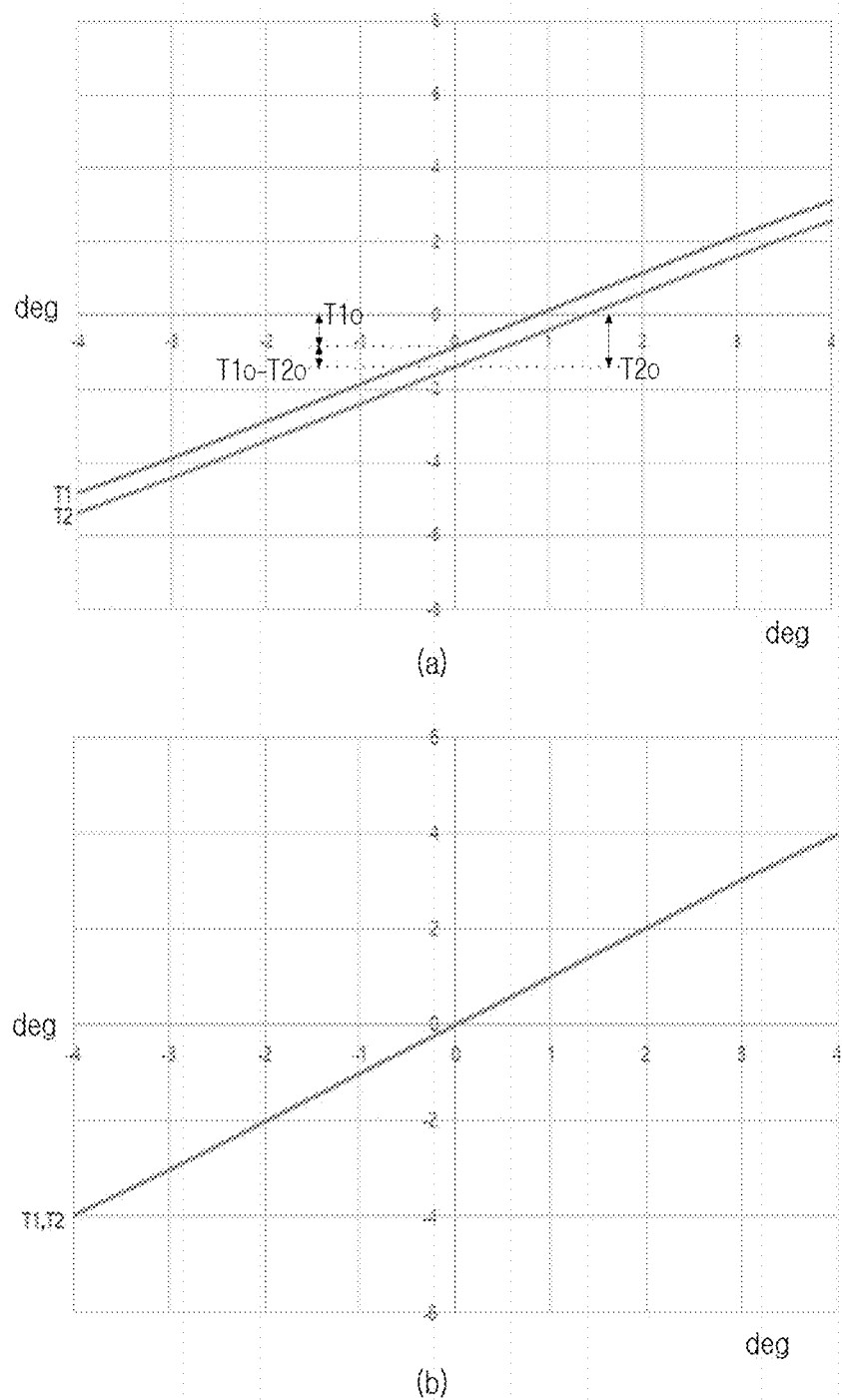

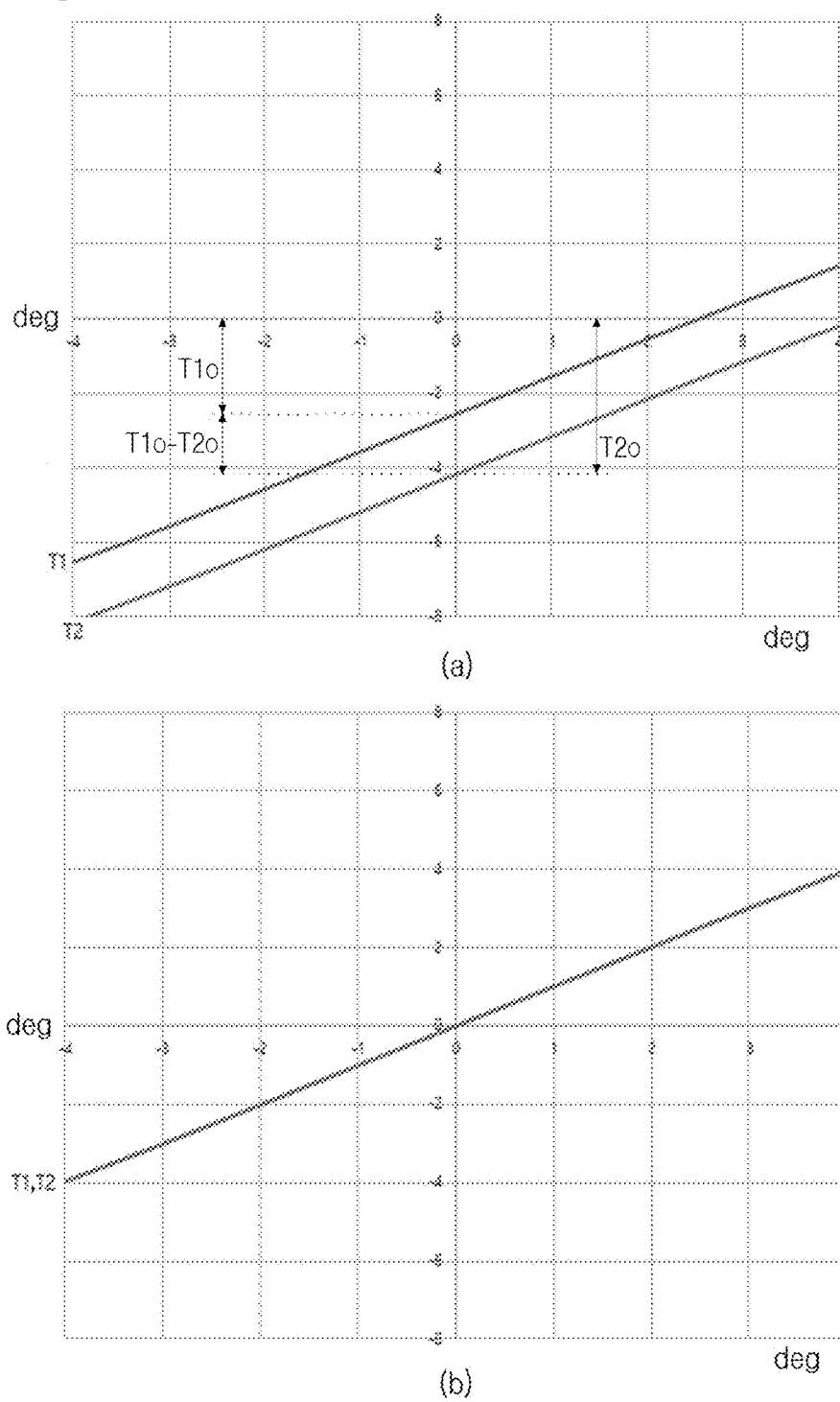

[Fig.18]
a : 1.13  
b : 2.13
a : 1.54  
b : 2.54
a : 1.58  
b : 2.58
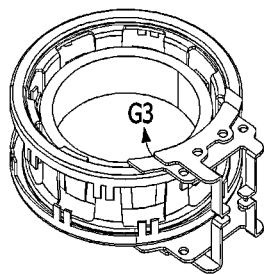
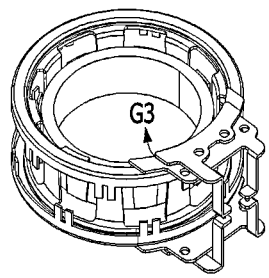
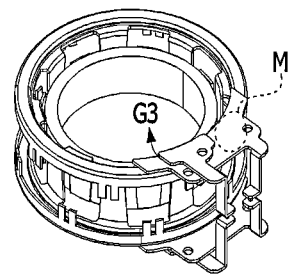
(a)　　　　　　　　(b)　　　　　　　　(c)

[Fig.19]
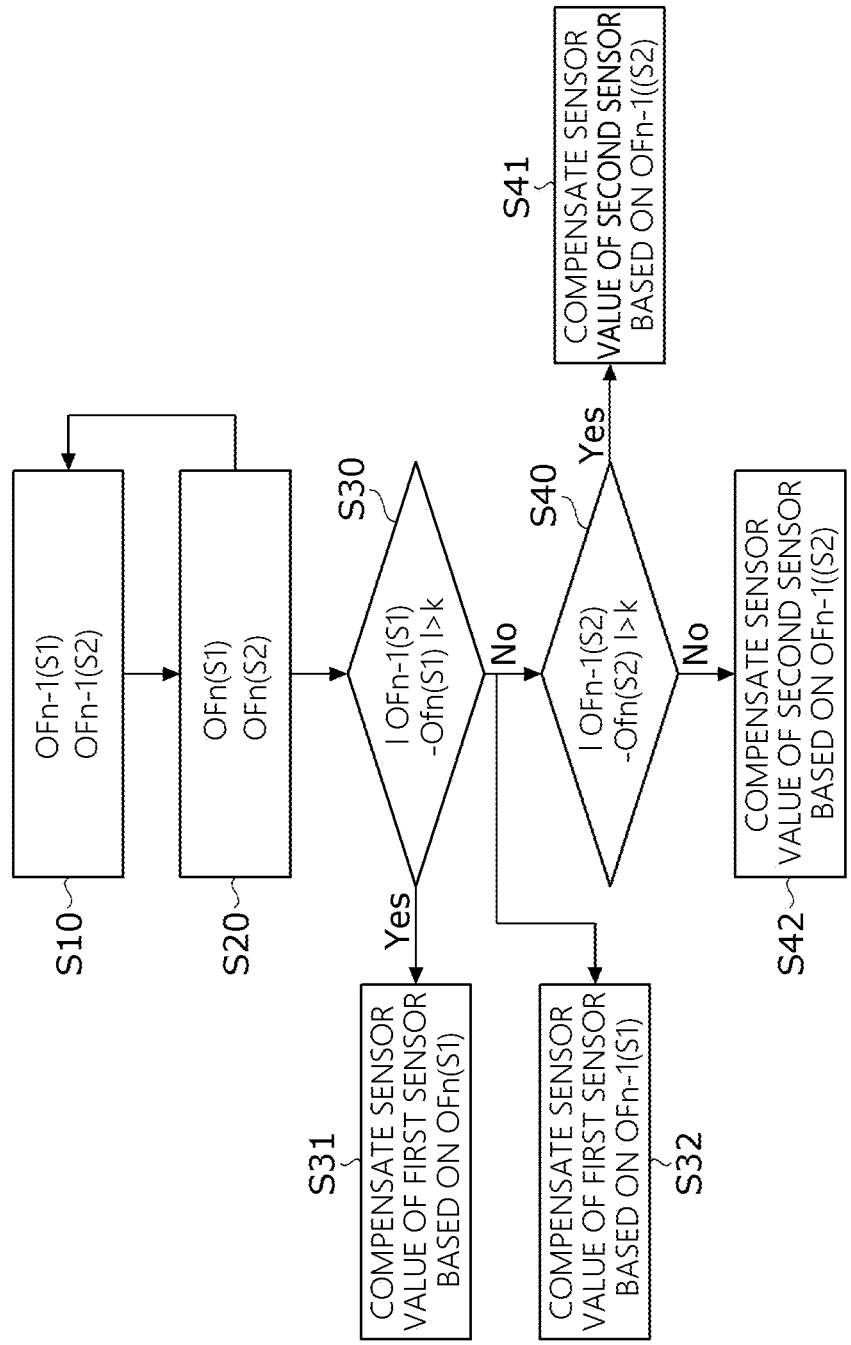

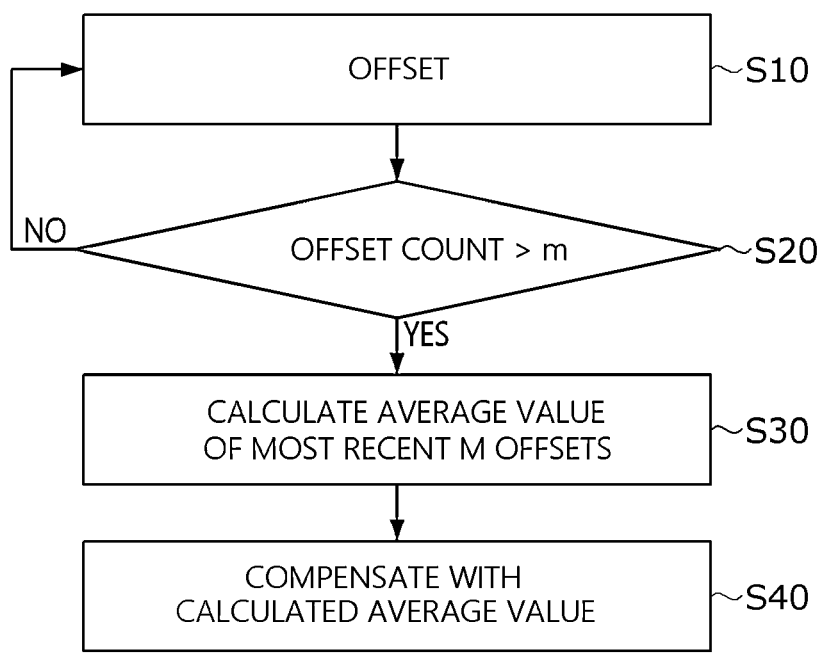
[Fig.20]

[Fig.21]

| ORDER | offset V | Offset AVERAGE VALUE V | NOTE |
|---|---|---|---|
| 1 | 0.0030 | | |
| 2 | 0.0051 | | |
| 3 | 0.0051 | | |
| 4 | 0.0056 | 0.0047 | AVERAGE VALUE OF 1,2,3,4 |
| 5 | 0.0047 | 0.0051 | AVERAGE VALUE OF 2,3,4,5 |
| 6 | 0.0039 | 0.0048 | |
| 7 | 0.0051 | 0.0048 | |
| 8 | 0.0047 | 0.0046 | |
| 9 | 0.0047 | 0.0046 | |
| 10 | 0.0056 | 0.0050 | |
| 11 | 0.0030 | 0.0045 | |
| 12 | 0.0034 | 0.0042 | |
| 13 | 0.0030 | 0.0038 | |
| 14 | 0.0030 | 0.0031 | |
| 15 | 0.0026 | 0.0030 | |
| Min | 0.0026 | 0.0030 | |
| Max | 0.0056 | 0.0051 | |
| Max-Min | 0.0030 | 0.0021 | |

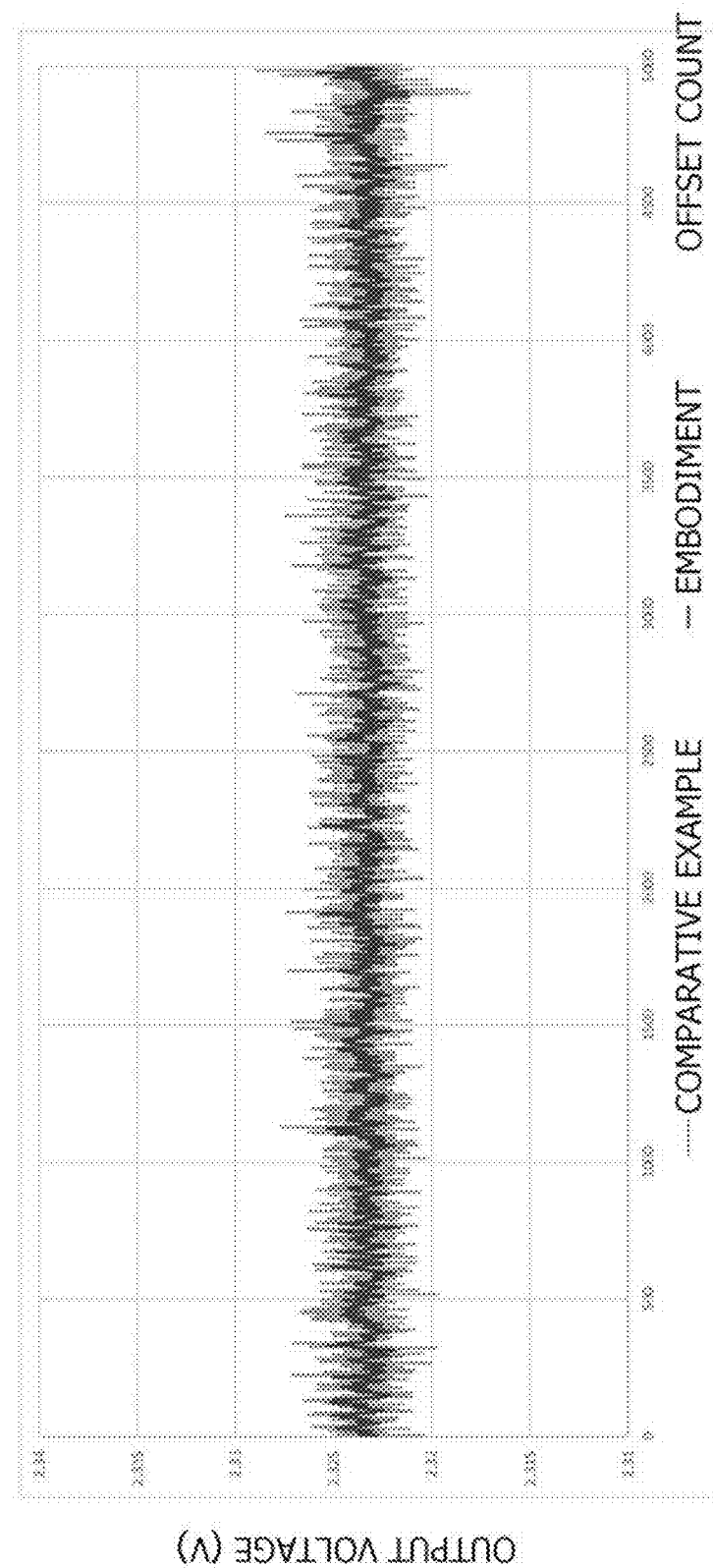
[Fig.22]

SENSING DEVICE

CROSS REFERENCE TO RELATED APPLICATIONS

This application is the National Phase of PCT International Application No. PCT/KR2022/014963, filed on Oct. 5, 2022, which claims priority under 35 U.S.C. 119 (a) to Patent Application No. 10-2021-0133182, filed in the Republic of Korea on Oct. 7, 2021, and Patent Application No. 10-2021-0133185, filed in the Republic of Korea on Oct. 7, 2021, all.

TECHNICAL FIELD

The present invention relates to a sensing device.

BACKGROUND ART

An electronic power steering system (EPS) controls an electronic control unit to drive a motor according to driving conditions so as to ensure turning stability and provide rapid restoration, thereby enabling a driver to drive safely.

The EPS includes a sensor device that measures a steering shaft torque, a steering angle, and the like to provide appropriate torque. The sensor device is a device for measuring the degree of twist of a torsion bar. The torsion bar is a member that connects an input shaft and an output shaft of a steering shaft, wherein the input shaft connected to a handle and the output shaft connected to a power transmission component at a wheel side.

The sensor device includes a housing, a rotor, a stator including stator teeth, and a collector. In this case, the collector is disposed outside the stator teeth. Accordingly, when an external magnetic field is generated, the collector acts as a conduit for the external magnetic field, thereby affecting a magnetic flux value of the sensor. When the sensor is affected in this way, an output value of the sensor device changes and the degree of twist of a torsion bar cannot be accurately measured.

DISCLOSURE

Technical Problem

The present invention is directed to providing a sensing device capable of compensating for the amount of change in output values of a sensor by external magnetism.

Technical Solution

One aspect of the present invention provides a sensing device including a rotor, a stator disposed to correspond to the rotor, a first collector disposed on an upper side of the stator and a second collector disposed on a lower side of the stator, and a first sensor and a second sensor disposed between the first collector and the second collector, wherein the first collector includes a first unit collector and a second unit collector, a sensing value of at least one of the first sensor and the second sensor is compensated based on an offset obtained by multiplying a difference value between a sensing value of the first sensor by magnetic flux transmitted to the first unit collector and a sensing value of the second sensor by magnetic flux transmitted to the second unit collector by a compensation coefficient, and any one of a first offset and a second offset is selected so that a sensing value of at least one of the first sensor and the second sensor is compensated based on a first difference value between the first offset, which is an $n-1^{th}$ offset, and the second offset, which is an $n^{th}$ offset, where n is a positive integer.

Another aspect of the present invention provides a sensing device including a rotor, a stator disposed to correspond to the rotor, a first collector disposed on an upper side of the stator and a second collector disposed on a lower side of the stator, and a first sensor and a second sensor disposed between the first collector and the second collector, wherein the first collector includes a first unit collector and a second unit collector, a sensing value of at least one of the first sensor and the second sensor is compensated based on an offset obtained by multiplying a difference value between a sensing value of the first sensor transmitted to the first unit collector and a sensing value of the second sensor transmitted to the second unit collector by a compensation coefficient, and a sensing value of at least one of the first sensor and the second sensor is compensated based on an average value of a plurality of sequentially input offsets.

Advantageous Effects

In an embodiment, since the magnetic resistance of a collector varies, the performance of a sensor device can be secured by compensating for the amount of change in output values due to external magnetism.

In an embodiment, even when external magnetism greatly increases, the size of a compensation value is reduced because a difference value in magnetic flux values between collectors is used.

In an embodiment, the amount of change in output values due to external magnetism can be compensated for without significantly changing an existing collector structure.

In an embodiment, noise generated in a process of compensating for the amount of change in output values due to external magnetism can be removed.

DESCRIPTION OF DRAWINGS

FIG. 1 is a perspective view illustrating a sensing device according to an embodiment.

FIG. 2 is an exploded view of the sensing device illustrated in FIG. 1.

FIG. 3 is a front view of the sensing device illustrated in FIG. 1.

FIG. 4 is a perspective view illustrating a first unit collector.

FIG. 5 is a perspective view illustrating a second unit collector.

FIG. 6 is a perspective view illustrating a third unit collector.

FIG. 7 is a perspective view illustrating a fourth unit collector.

FIGS. 8 and 9 are views illustrating a first unit collector, a second unit collector, a third unit collector, and a fourth unit collector.

FIG. 10 is a view illustrating a first unit collector and a second unit collector.

FIG. 11 is a view illustrating a sensing device according to another embodiment.

FIG. 12 is a view illustrating a first unit collector, a second unit collector, and a third unit collector illustrated in FIG. 11.

FIG. 13 is a graph illustrating a process of compensating the sensitivity of a first sensor and the sensitivity of a second sensor in the absence of external magnetism.

FIG. 14 is a graph illustrating a process of compensating the sensitivity of a first sensor and the sensitivity of a second sensor in the presence of external magnetism.

FIG. 15 is a comparison graph of a sensing value of a first sensor and a sensing value of a second sensor in the absence of external magnetism.

FIG. 16 is a comparison graph of a sensing value of a first sensor and a sensing value of a second sensor in the presence of external magnetism (1500 A/m).

FIG. 17 is a comparison graph of a sensing value of a first sensor and a sensing value of a second sensor in the presence of relatively strong external magnetism (4500 A/m), FIG. 18 is a view illustrating a compensation coefficient corresponding to a change in a third gap and a shape of a collector.

FIG. 19 is a view illustrating a process of removing noise generated in a process of compensating for the amount of change in output values due to external magnetism.

FIG. 20 is a view illustrating a process of removing noise generated in a process of compensating for the amount of change in output values due to external magnetism.

FIG. 21 is a table showing the average values of offsets.

FIG. 22 is a comparison graph of an output voltage of a sensing device according to a comparative example and an output voltage of the sensing device according to the embodiment.

MODES OF THE INVENTION

Hereinafter, a direction perpendicular to an axial direction of a sensing device is called a radial direction, and a direction along a circle with a radius centered on the axis is called a circumferential direction.

FIG. 1 is a perspective view illustrating a sensing device according to an embodiment, FIG. 2 is an exploded view of the sensing device illustrated in FIG. 1, and FIG. 3 is a front view of the sensing device illustrated in FIG. 1.

Referring to FIGS. 1 to 3, the sensing device according to the embodiment may include a stator 100, a rotor 200 partially disposed on the stator 100, a first collector 300, a second collector 400, a first sensor T1, and a second sensor T2.

Here, the stator 100 is connected to an output shaft (not shown), and the rotor 200 of which at least portion is rotatably disposed on the stator 100 may be connected to an input shaft (not shown), but is not necessarily limited thereto. Here, the rotor 200 may be disposed to be rotatable with respect to the stator 100. Hereinafter, "inward" refers to a direction toward a center based on a radial direction, and "outward" refers to a direction opposite to "inward."

The stator 100, the first collector 300, and the second collector 400 may be fixed to separate holders or housings.

The stator 100 may include first stator teeth 110 and second stator teeth 120.

The rotor 200 may include a magnet 210. The magnet 210 may be disposed inside the stator 100. The magnet 210 may be connected to the input shaft through a separate holder.

Each of the first sensor T1 and the second sensor T2 detects a change in magnetic field generated between the stator 100 and the rotor 200. The first sensor T1 and the second sensor T2 may each be a Hall IC. The sensing device measures torque based on the detected change in the magnetic field.

The first collector 300 may be disposed on an upper side of the stator 100. The second collector 400 may be disposed on a lower side of the stator 100. The first sensor T1 is disposed to correspond to the first collector 300 and the second collector 400. The second sensor T2 is also disposed to correspond to the first collector 300 and the second collector 400.

The first collector 300 may include a first unit collector 310 and a second unit collector 320. The first unit collector 310 is a collector that is relatively less affected by external magnetism, and the second unit collector 320 is a collector that is relatively more affected by external magnetism. The difference in sensing values between the first unit collector 310 and the second unit collector 320 is used to compensate for the amount of change in a sensing value due to an external magnetic field.

The first unit collector 310 may include a first plate 311 and a first leg 312. The first leg 312 protrudes from the first plate 311 and is disposed to extend toward the second collector 400. The first leg 312 is disposed to correspond to the first sensor T1.

The second unit collector 320 may include a second plate 321 and a second leg 322. The second plate 321 is disposed to overlap the first plate 311 in the axial direction. The second plate 321 may be disposed on an upper side of the first plate 311. The second leg 322 protrudes from the second plate 321 and is disposed to extend toward the second collector 400. The second leg 322 is disposed to correspond to the second sensor T2.

The second collector 400 may include a third unit collector 410 and a fourth unit collector 420. The third unit collector 410 is a collector that is relatively less affected by external magnetism, and the fourth unit collector 420 is a collector that is relatively more affected by external magnetism. The difference in sensing values between the third unit collector 410 and the fourth unit collector 420 is used to compensate for the amount of change in a sensing value due to an external magnetic field.

The third unit collector 410 may include a third plate 411 and a third leg 412. The third leg 412 protrudes from the third plate 411 and is disposed to extend toward the first collector 300. The third leg 412 is disposed to correspond to the first sensor T1.

The fourth unit collector 420 may include a fourth plate 421 and a fourth leg 422. The fourth plate 421 is disposed to overlap the third plate 411 in the axial direction. The third plate 411 may be disposed on a lower side of the fourth plate 421. The fourth leg 422 protrudes from the fourth plate 421 and is disposed to extend toward the first collector 300. The fourth leg 422 is disposed to correspond to the second sensor T2.

FIG. 4 is a perspective view illustrating the first unit collector 310.

Referring to FIG. 4, the first unit collector 310 may include the first plate 311 and the first leg 312. The first plate 311 is a flat member and may include a first body 311a and a first extension portion 311b. An inner surface of the first body 311a may be curved. The first body 311a may include a plurality of fastening holes H1 for fixing the first unit collector 310. The first extension portion 311b is disposed to extend outward from the first body 311a. The first plate 311 may be fixed to a separate housing. The first leg 312 may be formed by bending the first extension portion 311b. The first leg 312 may include a first leg body 312a and a first tip 312b. The first leg body 312a is disposed to be bent downward from the first extension portion 311b. Also, the first tip 312b is bent in a circumferential direction from the first leg body 312a and disposed to face the first sensor T1.

FIG. 5 is a perspective view illustrating the second unit collector 320.

Referring to FIG. 5, the second unit collector 320 may include the second plate 321 and the second leg 322. The second plate 321 is a flat member and may include a second body 321a and a second extension portion 321b. An inner surface of the second body 321a may be curved. The second body 321a may include a plurality of fastening holes H2 for fixing the second unit collector 320. The second extension portion 321b is disposed to extend outward from the second body 321a. The second plate 321 may be fixed to a separate housing. The second leg 322 may be formed by bending the second extension portion 321b. The second leg 322 may include a second leg body 322a and a second tip 322b. The second leg body 322a is disposed to be bent downward from the second extension portion 321b. Also, the second tip 322b is bent from the second leg body 322a and disposed to face the second sensor T2.

FIG. 6 is a perspective view illustrating the third unit collector 410.

Referring to FIG. 6, the third unit collector 410 may include the third plate 411 and the third leg 412. The third plate 411 is a flat member and may include a third body 411a and a third extension portion 411b. An inner surface of the third body 411a may be curved. The third body 411a may include a plurality of fastening holes H3 for fixing the third unit collector 410. The third extension portion 411b is disposed to extend outward from the third body 411a. The third plate 411 may be fixed to a separate housing. The third leg 412 may be formed by bending the third extension portion 411b. The third leg 412 may include a third leg body 412a and a third tip 412b. The third leg body 412a is disposed to be bent upward from the third extension portion 411b. Also, the third tip 412b is bent in the circumferential direction from the third leg body 412a and disposed to face the first sensor T1. The third unit collector 410 may have the same shape and size as the first unit collector 310.

FIG. 7 is a perspective view illustrating the fourth unit collector 420.

Referring to FIG. 7, the fourth unit collector 420 may include the fourth plate 421 and the fourth leg 422. The fourth plate 421 is a flat member and may include a fourth body 421a and a fourth extension portion 421b. An inner surface of the fourth body 421a may be curved. The fourth body 421a may include a plurality of fastening holes H4 for fixing the fourth unit collector 420. The fourth extension portion 421b is disposed to extend outward from the fourth body 421a. The fourth plate 421 may be fixed to a separate housing. The fourth leg 422 may be formed by bending the fourth extension portion 421b. The fourth leg 422 may include a fourth leg body 422a and a fourth tip 422b. The fourth leg body 422a is disposed to be bent upward from the fourth extension portion 421b. Also, the fourth tip 422b is bent in the circumferential direction from the fourth leg body 422a and disposed to face the second sensor T2. The fourth unit collector 420 may have the same shape and size as the second unit collector 320.

FIGS. 8 and 9 are views illustrating the first unit collector 310, the second unit collector 320, the third unit collector 410, and the fourth unit collector 420.

Referring to FIGS. 1, 8 and 9, in the axial direction, the first collector 300 may be disposed on one sides of the first sensor T1 and the second sensor T2. The second collector 400 may be disposed on the other sides of the first sensor T1 and the second sensor T2. In the axial direction, the first leg 312 of the first collector 300 and the third leg 412 of the second collector 400 are disposed with a first gap G1 therebetween. The first leg 312 and the third leg 412 are disposed to overlap in the axial direction. Also, in the axial direction, the second leg 322 of the first collector 300 and the fourth leg 422 of the second collector 400 are disposed with a second gap G2 therebetween. The second leg 322 and the fourth leg 422 are disposed to overlap in the axial direction. Each of the first gap G1 and the second gap G2 acts as magnetic resistance.

The first plate 311 of the first unit collector 310 and the second plate 321 of the second unit collector 320 form an overlap area A1 in the axial direction. The second plate 321 is disposed above the first plate 311 to block external magnetism from flowing toward the first plate 311 and guides the external magnetism to the first leg 312. The first plate 311 and the second plate 321 are disposed with a third gap G3 therebetween in the axial direction. This gap acts as magnetic resistance in the first unit collector 310.

The third plate 411 of the third unit collector 410 and the fourth plate 421 of the fourth unit collector 420 may form an overlap area A2 in the axial direction. The fourth plate 421 is disposed below the third plate 411 to block external magnetism from flowing toward the third plate 411 and guides the external magnetism to the fourth leg 422. The third plate 411 and the fourth plate 421 are disposed with a fourth gap G4 therebetween in the axial direction. This gap acts as magnetic resistance in the third unit collector 410.

When external magnetism occurs, the external magnetism flows along a second path P2 passing through the second plate 321, the second leg 322, the second sensor T2, and the fourth leg 422. In addition, external magnetism flows along a first path P1 passing through the first plate 311, the first leg 312, the first sensor T1, and the third leg 412.

While the first path P1 has magnetic resistance due to only the second gap G2, the second path P2 has additional magnetic resistance due to the third gap G3 in addition to the first gap G1. Therefore, a relatively large amount of magnetic flux flows through the first path P1. Therefore, in response to external magnetism, a difference occurs between a sensing value measured by the first sensor T1 and a sensing value measured by the second sensor T2.

Although not shown in the drawings, when external magnetism flows from the second collector 400, the flow of magnetic flux is formed in the same way as when flowing from the first collector 300, thereby resulting in a difference between a sensing value measured at the first sensor T1 and a sensing value measured at the second sensor T2.

In the first collector 300, first, the second plate 321 covers the first plate 311 and induces external magnetism flowing toward the first leg 312 to flow toward the second leg 322. Second, resistance to external magnetism is formed through the third gap G3 formed between the first plate 311 and the second plate 321, thereby causing a difference between a sensing value measured by the first sensor T1 and a sensing value measured by the second sensor T2. This is the same for the second collector 400.

The size of the third gap G3 may be in the range of 2.0 mm to 3.5 mm. When the size of the third gap G3 is less than 2.0 mm, the magnetic resistance for the third gap G3 is not sufficient, and when the size of the third gap G3 is greater than 3.5 mm, there is a limit to the compensation coefficient and an axial length of the sensing device increases.

Meanwhile, an axial length L2 of the second leg 322 is greater than an axial length L1 of the first leg 312. Also, an axial length L3 of the third leg 412 is greater than an axial length L4 of the fourth leg 422. For example, a ratio of the axial length L1 of the first leg 312 and the axial length L2 of the second leg 322 may be in the range of 1:1.1 to 1:1.2.

Also, a ratio of the third length and the length of the fourth leg 422 in the axial direction may also be in the range of 1:1.1 to 1:1.2.

FIG. 10 is a view illustrating the first unit collector 310 and the second unit collector 320.

Referring to FIG. 10, the size of the first unit collector 310 is set by considering an overlap area and location with the second unit collector 320. For example, when viewed in the axial direction, an overlap area A1 of the first plate 311 and the second plate 321 may be in the range of 50% to 100% of an area of the first plate 311. When the overlap area A1 of the first plate 311 and the second plate 321 is at least 50% of the area of the first plate 311, a meaningful difference value between a sensing value measured by the first sensor T1 and a sensing value measured by the second sensor T2 may be derived. Although not shown in the drawing, an area of an overlap area between the third plate 411 and the fourth plate 421 may also be in the range of 50% to 100% of an area of the third plate 411 when viewed in the axial direction.

Meanwhile, a ratio of an inner circumferential length K1 of the first plate 311 and an inner circumferential length K2 of the second plate 321 may be in the range of 1:1.3 to 1:1.7. Also, although not shown in the drawing, a ratio of an inner circumferential length of the third plate 411 and an inner circumferential length of the fourth plate 421 may be in the range of 1:1.3 to 1:1.7.

FIG. 11 is a view illustrating a sensing device according to another embodiment, and FIG. 12 is a view illustrating a first unit collector 310, a second unit collector 320, and a third unit collector 410 illustrated in FIG. 11.

Referring to FIGS. 11 and 12, the sensing device according to another embodiment may include the first unit collector 310 and the second unit collector 320 as the first collector 300, and may include only the third unit collector 410 as the second collector 400. That is, a collector corresponding to external magnetism may be disposed on only one side of the stator 100.

For example, only the third unit collector 410 is disposed on a lower side of the stator 100, and the third unit collector 410 may include the third plate 411, the third leg 412, and a fifth leg 413. The third leg 412 extends from one side of the third plate 411, and the fifth leg 413 extends from the other side of the third plate 411.

In an axial direction, the second leg 322 of the first collector 300 and the fifth leg 413 of the second collector 400 are disposed with the second gap G2 therebetween. The second leg 322 and the fifth leg 413 are disposed to overlap in the axial direction.

When external magnetism occurs, the external magnetism flows along a first path P1 passing through the second plate 321, the second leg 322, the second sensor T2, and the fifth leg 413. In addition, external magnetism flows along a second path P2 passing through the second plate 321, the first plate 311, the first leg 312, the first sensor T1, and the third leg 412.

In this sensing device, a process of compensating a sensing value of the first sensor T1 and a sensing value of the second sensor T2 corresponding to external magnetism is as follows.

The sensing value of the first sensor T1 is compensated by Equation 1 below.

$$T1c = T1o - a*(T2o - T1o) \qquad \text{<Equation 1>}$$

Here, T1c is a compensated sensing value of the first sensor T1, T1o is an uncompensated sensing value of the first sensor T1, T2o is an uncompensated sensing value of the second sensor T2, and a is a compensation coefficient corresponding to an axial separation distance (the third gap G3) between the first unit collector 310 and the second unit collector 320 in the first sensor T1.

Also, a sensing value of the second sensor T2 is compensated by Equation 2 below.

$$T2c = T2o - b*(T2o - T1o) \qquad \text{<Equation 2>}$$

Here, T2c is a compensated sensing value of the second sensor T2, T1o is an uncompensated sensing value of the first sensor T1, and T2o is an uncompensated sensing value of the second sensor T2, and b is a compensation coefficient corresponding to an axial separation distance (the third gap G3) between the first unit collector 310 and the second unit collector 320 in the second sensor T2.

a and b may be preset values corresponding to the third gap G3. a and b may also vary depending on shapes of the second unit collector 320 or the third unit collector 410. The following description is based on the case where a is 2.72 and b is 3.72.

FIG. 13 is a graph illustrating a process of compensating the sensitivity of a first sensor T1 and the sensitivity of a second sensor T2 in the absence of external magnetism. As shown in FIG. 13A, the first sensor T1 and the second sensor T2 in the absence of external magnetism have a difference in sensitivity corresponding to magnetic flux. The sensitivity of the second sensor T2 is lower than the sensitivity of the first sensor T1. As shown in FIG. 13B, the sensitivity of the first sensor T1 and the sensitivity of the second sensor T2 may be directly compensated in a process of outputting a sensing value (output angle) of the first sensor T1 and a sensing value (output angle) of the second sensor T2 in the absence of external magnetism.

FIG. 14 is a graph illustrating a process of compensating the sensitivity of a first sensor T1 and sensitivity of a second sensor T2 in the presence of external magnetism.

As shown in FIG. 14A, in the presence of external magnetism, the first sensor T1 and the second sensor T2 are affected by the external magnetism. Accordingly, an offset G1 occurs in the first sensor T1, and a relatively large offset G2 occurs in the second sensor T2. Therefore, in the presence of external magnetism as shown in FIG. 14B, after the sensitivity of the first sensor T1 and the sensitivity of the second sensor T2 are compensated, an offset occurs in each of a sensing value T1o of the first sensor T1 and a sensing value T2o of the second sensor T2.

Due to this offset, the sensing value T1o of the first sensor T1 and the sensing value T2o of the second sensor T2 have a constant difference value (T1o–T2o) in the entire range of angles.

FIG. 15 is a comparison graph of a sensing value of a first sensor T1 and a sensing value of a second sensor T2 in the absence of external magnetism. FIG. 15A shows an uncompensated sensing value of the first sensor T1 and an uncompensated sensing value of the second sensor T2, and FIG. 15B shows a compensated sensing value of the first sensor T1 and a compensated sensing value of the second sensor T2.

In the absence of external magnetism, as can be seen in Equations 1 and 2, the sensing value of the first sensor T1 and the sensing value of the second sensor T2 are the same, that is, T2$o$−T1$o$ becomes 0 and an uncompensated sensing value of the first sensor T1 and a compensated sensing value of the first sensor T1 are the same. Also, an uncompensated sensing value of the second sensor T2 and a compensated sensing value of the second sensor T2 are the same.

FIG. 16 is a comparison graph of a sensing value of a first sensor T1 and a sensing value of a second sensor T2 in the presence of external magnetism (1500 A/m). FIG. 16A shows an uncompensated sensing value of the first sensor T1 and an uncompensated sensing value of the second sensor T2, and FIG. 16B shows a compensated sensing value of the first sensor T1 and a compensated sensing value of the second sensor T2. In the presence of external magnetism (1500 A/m), a difference value (T2$o$−T1$o$) between a sensing value of the first sensor T1 and a sensing value of the second sensor T2 is detected as 0.54. When a is 2.72 and b is 3.72, a compensated sensing value of the first sensor T1 is obtained through Equation 1, and when a compensated sensing value of the second sensor T2 is obtained through Equation 2, as shown in FIG. 16B it may be confirmed that the compensated sensing value of the first sensor T1 and the compensated sensing value of the second sensor T2 are the same and an offset does not occur but is compensated for.

FIG. 17 is a comparison graph of a sensing value of a first sensor T1 and a sensing value of a second sensor T2 in the presence of relatively strong external magnetism (4500 A/m). FIG. 17A shows an uncompensated sensing value of the first sensor T1 and an uncompensated sensing value of the second sensor T2, and FIG. 17B shows a compensated sensing value of the first sensor T1 and a compensated sensing value of the second sensor T2.

In the presence of relatively strong external magnetism (4500 A/m), a difference value (T2$o$−T1$o$) between a sensing value of the first sensor T1 and a sensing value of the second sensor T2 is detected as 1.62. When a is 2.72 and b is 3.72, a compensated sensing value of the first sensor T1 is obtained through Equation 1, and when a compensated sensing value of the second sensor T2 is obtained through Equation 2, a small offset 0.002 deg occurs as shown in FIG. 17B, but it can be seen that the compensated sensing value of the first sensor T1 and the compensated sensing value of the second sensor T2 are almost identical.

FIG. 18 is a view illustrating a compensation coefficient corresponding to a change in a third gap G3 and a shape of a collector.

FIG. 18A shows a sensing device with the third gap G3 set to 3.15 mm, and FIG. 18B shows a sensing device with the third gap G3 set to 2.15 mm. FIG. 18C is set the same as FIG. 18B with the third gap G3 set to 2.15 mm, and a part of the collector is removed like M in FIG. 18C to make the collector size smaller than in FIG. 18A or B.

Comparing FIGS. 18B and C, there is little difference in the compensation coefficient, and it can be seen that the shape of the collector does not significantly affect the compensation coefficient. However, comparing FIGS. 18A and B, since the difference in the compensation coefficient is large, it can be seen that a difference in the third gap G3 greatly affects the compensation coefficient.

Meanwhile, due to the self-noise of the first sensor T1 or the self-noise of the second sensor T2, in this way, the noise of a compensated sensing value of the first sensor T1 or the noise of a compensated sensing value of the second sensor T2 may increase significantly.

FIG. 19 is a view illustrating a process of removing noise generated in a process of compensating for the amount of change in output values due to external magnetism.

Referring to FIG. 19, in order to remove such noise, the sensing device according to the embodiment may select any one of a first offset OFn−1 and a second offset OFn and compensate a sensing value of at least one of the first sensor T1 and the sensing value of the second sensor T2 based on a first difference value between the first offset OFn−1, which is the n−1$^{th}$ offset, and the second offset OFn, which is the n$^{th}$ offset. Here, n means a positive integer.

The offset is a difference between a sensing value of a first sensor T1 transmitted to the first unit collector 310 and a sensing value of a second sensor T2 transmitted to the second unit collector 320 multiplied by a compensation coefficient, which is a value represented by a*(T2$o$−T1$o$) in Equation 1 or b*(T2$o$−T1$o$) in Equation 2, respectively.

The offset may be calculated at regular intervals. Hereinafter, the n−1$^{th}$ offset is referred to as the first offset OFn−1, and the n$^{th}$ offset is referred to as the second offset OFn. The second offset OFn may be a currently calculated offset, and the first offset OFn−1 may be an offset calculated immediately before.

A first offset OFn−1 of the first sensor T1 and a first offset OFn−1 of the second sensor T2 are calculated (S10). Next, a second offset OFn of the first sensor T1 is calculated, and a second offset OFn of the second sensor T2 is calculated (S20).

Next, it is determined whether the absolute value of the first difference value between the first offset OFn−1 of the first sensor T1 and the second offset OFn of the first sensor T1 exceeds a reference value. A reference value k (for example, 0.01 V) is a preset value corresponding to conditions such as response characteristics or noise standards of the sensing device.

When the first difference value is greater than the reference value k, a sensor value of the first sensor T1 is compensated through Equation 1 by reflecting the second offset OFn (S31). When the first difference value is greater than the reference value k, the amount of offset variation is large due to the influence of the actual external magnetic field, and accordingly, a sensor value of the first sensor T1 is compensated by reflecting the current second offset OFn.

However, when the first difference value is smaller than or equal to the reference value k, a sensor value of the first sensor T1 is compensated through Equation 1 by reflecting the first offset OFn−1 (S32). When the first difference value is smaller than or equal to the reference value k, the actual influence of the external magnetic field is not large, and accordingly, the first offset OFn−1, which is the immediately previous offset, is reflected in Equation 1 without newly updating the offset, thereby compensating a sensor value of the first sensor T1.

Next, it is determined whether the absolute value of the first difference value between the first offset OFn−1 of the second sensor T2 and the second offset OFn of the second sensor T2 exceeds a reference value (S40).

When the first difference value is greater than the reference value k, a sensor value of the second sensor T2 is compensated through Equation 2 by reflecting the second offset OFn (S41).

However, when the first difference value is smaller than or equal to the reference value k, the sensor value of the second sensor T2 is compensated through Equation 2 by reflecting the first offset OFn−1 (S42).

Since the compensation coefficient is multiplied in the process of compensating a sensor value of the first sensor T1 and a sensor value of the second sensor T2 through Equations 1 and 2, noise may be greatly amplified. In a situation where the actual influence of the external magnetic field is not large, there is an advantage in preventing amplification of noise by compensating for a sensor value of the first sensor T1 or a sensor value of the second sensor T2 through the existing offset.

FIG. 20 is a view illustrating a process of removing noise generated in a process of compensating for the amount of change in output values due to external magnetism, and FIG. 21 is a table showing the average values of offsets.

Referring to FIGS. 20 and 21, in order to remove such noise, the sensing device according to the embodiment may compensate a sensing value of the first sensor T1 or a sensing value of the second sensor T2 based on an average value of a plurality of sequentially input offsets.

The offset is a difference between a sensing value of a first sensor T1 transmitted to the first unit collector 310 and a sensing value of a second sensor T2 transmitted to the second unit collector 320 multiplied by a compensation coefficient, which is a value represented by a*(T2o−T1o) in Equation 1 or b*(T2o−T1o) in Equation 2, respectively.

The offset may be calculated at regular intervals. For example, as shown in FIG. 20, based on the sensing value of the first sensor T1 and the sensing value of the second sensor T2, offsets may be calculated at regular intervals in order 1, 2, 3 . . . . An offset of order 1 may be 0.003 V, an offset of order 2 may be 0.0051 V, and an offset of order 3 may be 0.0051 V.

In order to remove noise, a sensing value of the first sensor T1 or a sensing value of the second sensor T2 may be compensated based on an average value from an $n^{th}$ offset to an $n-(m-1)^{th}$ offset, where m is a positive integer greater than 1, and n is a positive integer greater than m. For example, the sensing value of the first sensor T1 or the sensing value of the second sensor T2 may be compensated based on an average value of the most recent m offsets among the plurality of offsets.

The specific process for removing noise is as follows.
Offsets are calculated and input sequentially (S10).
It is checked whether the number of offsets is greater than m (S20).

When the number of offsets is greater than m, for example, when m is 4 and the number of offsets is 4, an average value of the four most recent offsets is calculated (S30). For example, when the current offset is an offset of order 4, 0.0047V, which is an average value of the offset of order 1, the offset of order 2, the offset of order 3, and the offset of order 4, may be selected as the offset.

Also, when the current offset is an offset of order 5, 0.0051V, which is an average value of the offset of order 2, the offset of order 3, the offset of order 4, and the offset of order 5, may be selected as the offset.

As described above, the sensor value of the first sensor T1 is compensated and the sensor value of the second sensor T2 is compensated through Equation 1 or Equation 2 using an average value (e.g., 0.0047 V or 0.0051 V) calculated as an offset (S40).

FIG. 22 is a comparison graph of an output voltage of a sensing device according to a comparative example and an output voltage of the sensing device according to the embodiment.

Referring to FIG. 22, the output voltage of the sensing device according to the comparative example compensates a sensor value of the first sensor T1 and a sensor value of the second sensor T2 without applying an average value, the output voltage of the sensing device according to the embodiment compensates a sensor value of the first sensor T1 and a sensor value of the second sensor T2 through an offset to which an average value of the latest four offsets is applied.

As a result of measuring about 5000 offsets, in the case of the comparative example, since the compensation coefficient is multiplied, and the offset is applied directly to Equations 1 and 2 in the process of compensating a sensor value of the first sensor T1 and a sensor value of the second sensor T2 through Equations 1 and 2, the amplitude of an output voltage appears large and noise is amplified.

On the other hand, in the case of the embodiment, since an offset to which an average value of the latest four offsets is applied is applied to Equations 1 and 2, the amplitude of an output voltage is relatively small, thereby preventing noise from being amplified.

The above-described embodiments may be used in various devices such as vehicles or home appliances.

The invention claimed is:

1. A sensing device comprising:
a rotor;
a stator disposed to correspond to the rotor;
a first collector disposed on an upper side of the stator and a second collector disposed on a lower side of the stator; and
a first sensor and a second sensor disposed between the first collector and the second collector,
wherein the first collector includes a first unit collector and a second unit collector,
a sensing value of at least one of the first sensor and the second sensor is compensated based on an offset obtained by multiplying a difference value between a sensing value of the first sensor by magnetic flux transmitted to the first unit collector and a sensing value of the second sensor by magnetic flux transmitted to the second unit collector by a compensation coefficient, and
one of a first offset and a second offset is selected so that the sensing value of at least one of the first sensor and the second sensor is compensated based on a first difference value between the first offset, which is an $n-1^{th}$ offset, and the second offset, which is an $n^{th}$ offset, where n is a positive integer.

2. The sensing device of claim 1, wherein, when the first difference value is greater than a reference value, the sensing value of at least one of the first sensor and the second sensor is compensated based on the second offset, and when the first difference value is smaller than or equal to the reference value, the sensing value of at least one of the first sensor and the second sensor is compensated based on the first offset.

3. The sensing device of claim 2, wherein the sensing value of the first sensor is compensated with a compensation value calculated by Equation 1 below, $$T1c = T1o - a*(T2o - T1o), \quad \text{[Equation 1]}$$

where T1c is a compensated sensing value of the first sensor, T1o is an uncompensated sensing value of the first sensor, T2o is an uncompensated sensing value of the second sensor, and a is a compensation coefficient corresponding to an axial separation distance between the first unit collector and the second unit collector.

4. The sensing device of claim 3, wherein the sensing value of the second sensor is compensated with a compensation value calculated by Equation 2 below, $$T2c = T2o - b*(T2o - T1o), \quad \text{[Equation 2]}$$

where T2c is a compensated sensing value of the second sensor, T1o is an uncompensated sensing value of the first sensor, T2o is an uncompensated sensing value of the second sensor, and b is a compensation coefficient corresponding to an axial separation distance between the first unit collector and the second unit collector.

5. The sensing device of claim 1, wherein the first unit collector includes a first plate and a first leg that protrudes from the first plate and extends toward the second collector, the second unit collector includes a second plate and a second leg that protrudes from the second plate and extends toward the second collector, and the first plate and the second plate are spaced apart from each other.

6. The sensing device of claim 5, wherein the first plate is spaced apart from and overlaps the second plate in an axial direction.

7. The sensing device of claim 5, wherein an axial length of the second leg is greater than an axial length of the first leg.

8. A sensing device comprising:
a rotor;
a stator disposed to correspond to the rotor;
a first collector disposed on an upper side of the stator and a second collector disposed on a lower side of the stator; and
a first sensor and a second sensor disposed between the first collector and the second collector,
wherein the first collector includes a first unit collector and a second unit collector,
a sensing value of at least one of the first sensor and the second sensor is compensated based on an offset obtained by multiplying a difference value between a sensing value of the first sensor by magnetic flux transmitted to the first unit collector and a sensing value of the second sensor by magnetic flux transmitted to the second unit collector by a compensation coefficient, and
the sensing value of at least one of the first sensor and the second sensor is compensated based on an average value of a plurality of sequentially input offsets.

9. The sensing device of claim 8, wherein the sensing value of at least one of the first sensor and the second sensor is compensated based on an average value of m offsets, and the sensing value of at least one of the first sensor and the second sensor is compensated based on an average value from an $n^{th}$ offset to an $n-(m-1)^{th}$ offset, where m is a positive integer greater than 1, and n is a positive integer greater than m.

10. The sensing device of claim 9, wherein the sensing value of at least one of the first sensor and the second sensor is compensated based on an average value of the most recent m offsets among the plurality of offsets, where m is a positive integer greater than 1.

* * * * *